(12) United States Patent
King et al.

(10) Patent No.: US 6,953,295 B2
(45) Date of Patent: Oct. 11, 2005

(54) SMALL FOOTPRINT COMPUTER SYSTEM

(75) Inventors: Tobin Allen King, Balmain (AU); Kia Silverbrook, Balmain (AU)

(73) Assignee: Silverbrook Research Pty Ltd, Balmain (AU)

( * ) Notice: Subject to any disclaimer, the term of this patent is extended or adjusted under 35 U.S.C. 154(b) by 47 days.

(21) Appl. No.: 10/974,758

(22) Filed: Oct. 28, 2004

(65) Prior Publication Data

US 2005/0058489 A1 Mar. 17, 2005

Related U.S. Application Data

(63) Continuation of application No. 10/309,026, filed on Dec. 4, 2002, now Pat. No. 6,830,395, which is a continuation of application No. 09/966,293, filed on Sep. 28, 2001, now Pat. No. 6,641,315, which is a continuation-in-part of application No. 09/112,767, filed on Jul. 10, 1998, now Pat. No. 6,416,167.

(30) Foreign Application Priority Data

Jul. 15, 1997 (AU) .............................................. PO7991
Mar. 25, 1998 (AU) .............................................. PO2592

(51) Int. Cl.$^7$ ................................................. B41J 5/10
(52) U.S. Cl. ........................ 400/472; 400/489; 400/88
(58) Field of Search .......................... 400/88, 472, 489

(56) References Cited

U.S. PATENT DOCUMENTS

| | | |
|---|---|---|
| 4,423,401 A | 12/1983 | Mueller |
| 4,553,393 A | 11/1985 | Ruoff |
| 4,623,965 A | 11/1986 | Wing |
| 4,672,398 A | 6/1987 | Kuwabara et al. |
| 4,737,802 A | 4/1988 | Mielke |
| 4,864,824 A | 9/1989 | Gabriel et al. |

(Continued)

FOREIGN PATENT DOCUMENTS

| | | |
|---|---|---|
| DE | 1 648 322 | 3/1971 |
| DE | 29 05 063 | 8/1980 |
| DE | 32 45 283 | 6/1984 |

(Continued)

OTHER PUBLICATIONS

Noworolski, J. Mark et al, "Process for in–plane and out––of–plane single–crystal–silicon thermal microactuators". Sensors and Actuators, A, CH, Elsevier Sequoia S.A., Lausanne, vol. 55, No. 1, Jul. 15, 1996, pp 65–69, XP004077979 ISSN: 0924–4247.

Ataka, Manabu et al, "Fabrication and Operation of Polymide Bimorph Actuators for Ciliary Motion System". Journal of Microelectromechanical Systems, US, IEEE Inc. New York, vol. 2, No. 4, Dec. 1, 1993, pp 146–150, XP000443412, ISSN: 1057–7157.

Yamagata, Yutaka et al, "A Micro Mobile Mechanism Using Thermal Expansion and its Theoretical Analysis". Proceedeing of the workshop on micro electro mechanical systems (MEMS), US, New York, IEEE, vol. Workshop 7, Jan. 25, 1994, pp 142–147, XP000528408, ISBN: 0–7803–1834–X.

"ABLEDATA Database of Assistive Technology", Feb. 1999 p2–3 shows Postron Express keyboard/printer.

(Continued)

Primary Examiner—Charles H. Nolan, Jr.

(57) ABSTRACT

A compact desktop computer system is provided that has a small footprint due to integration of a pagewidth printer into the computer system's keyboard. A data bus interconnects the keyboard and conveys commands from the keyboard to a computer, and signals from the computer to the integrated printer. The keyboard is fitted with a port to receive an ink cartridge that is in fluid communication with the pagewidth printer. The printer includes a transport assembly to move print media from an entry slot to an ejection slot located on opposing sides of the keyboard's housing

5 Claims, 3 Drawing Sheets

U.S. PATENT DOCUMENTS

| | | | |
|---|---|---|---|
| 5,029,805 A | | 7/1991 | Albarda et al. |
| 5,115,374 A | | 5/1992 | Hongoh |
| 5,188,464 A | | 2/1993 | Aaron |
| 5,189,473 A | * | 2/1993 | Negoro et al. ............... 399/93 |
| 5,258,774 A | | 11/1993 | Rogers |
| 5,345,403 A | * | 9/1994 | Ogawa et al. ............. 361/681 |
| 5,443,320 A | | 8/1995 | Agata et al. |
| 5,659,345 A | | 8/1997 | Altendorf |
| 5,845,144 A | | 12/1998 | Tateyama et al. |
| 6,155,669 A | | 12/2000 | Donahue et al. |
| 6,158,906 A | | 12/2000 | Simon et al. |
| 6,312,099 B1 | | 11/2001 | Hawkins |
| 6,474,882 B1 | * | 11/2002 | Vaghi ........................ 400/490 |
| 6,555,201 B1 | | 4/2003 | Dhuler et al. |
| 2001/0000447 A1 | * | 4/2001 | Thompson ................. 361/686 |
| 2004/0088468 A1 | * | 5/2004 | Hasegawa .................. 710/313 |

FOREIGN PATENT DOCUMENTS

| | | |
|---|---|---|
| DE | 34 30 155 | 2/1986 |
| DE | 37 16 996 | 12/1988 |
| DE | 39 34 280 | 4/1990 |
| DE | 43 28 443 | 3/1995 |
| DE | 195 16 997 | 11/1995 |
| DE | 195 17 969 | 11/1995 |
| DE | 195 32 913 | 3/1996 |
| DE | 196 23 620 | 12/1996 |
| DE | 196 39 717 | 4/1997 |
| EP | 0 398 031 | 11/1990 |
| EP | 0 427 291 | 5/1991 |
| EP | 0 431 338 | 6/1991 |
| EP | 0 478 956 | 4/1992 |
| EP | 0 506 232 | 9/1992 |
| EP | 0 510 648 | 10/1992 |
| EP | 0 627 314 | 12/1994 |
| EP | 0706893 B1 | 4/1996 |
| EP | 0 713 774 | 5/1996 |
| EP | 0 737 580 | 10/1996 |
| EP | 0 750 993 | 1/1997 |
| EP | 0 882 590 | 12/1998 |
| FR | 2 231 076 | 12/1974 |
| GB | 792 145 | 3/1958 |
| GB | 1 428 239 | 3/1976 |
| GB | 2 262 152 | 6/1993 |
| JP | 58 112747 | 7/1983 |
| JP | 58 116165 | 7/1983 |
| JP | 0 092 229 | 10/1983 |
| JP | 61 025849 | 2/1986 |
| JP | 61 268453 | 11/1986 |
| JP | 01 105746 | 4/1989 |
| JP | 01 115639 | 5/1989 |
| JP | 01 128839 | 5/1989 |
| JP | 01 257058 | 10/1989 |
| JP | 01 306254 | 12/1989 |
| JP | 02 050841 | 2/1990 |
| JP | 2-92643 | 4/1990 |
| JP | 2-108544 | 4/1990 |
| JP | 02 158348 | 6/1990 |
| JP | 02 162049 | 6/1990 |
| JP | 03 653348 | 3/1991 |
| JP | 03 112662 | 5/1991 |
| JP | 03 180350 | 8/1991 |
| JP | 04 118241 | 4/1992 |
| JP | 04 126255 | 4/1992 |
| JP | 04 141429 | 5/1992 |
| JP | 4-353458 | 12/1992 |
| JP | 04 368851 | 12/1992 |
| JP | 05108278 | 4/1993 |
| JP | 05 28765 | 10/1993 |
| JP | 05 318724 | 12/1993 |
| JP | 6-91865 | 4/1994 |
| JP | 6-91866 | 4/1994 |
| JP | 2-265752 | 1/1995 |
| JP | 07 314665 | 12/1995 |
| JP | 11212703 A * | 8/1999 ............. G06F/3/02 |
| WO | WO 94 18010 | 8/1994 |
| WO | WO 95.10810 | 4/1995 |
| WO | WO 97 12689 | 4/1997 |

OTHER PUBLICATIONS

"Enhanced Communications" website showing Postron Express keyboard/printer. Copyright 1997–2000 http://web.archive.org/web/20020819212351re_/http://www.enhancedcom.net/positron express.asp.

"TDD Products for PSAPS" (Larson) Mar./Apr. 1997 from 9–11 Magazine Note: Establishes that "Positron Express" keyboard integrated with printer was known in 1997.

* cited by examiner

SMALL FOOTPRINT COMPUTER SYSTEM

The present application is a continuation of U.S. application Ser. No. 10/309,026 filed on Dec. 4, 2002, now issued as U.S. Pat. No. 6,830,395, which is a continuation of U.S. application Ser. No. 09/966,293 filed on Sep. 28, 2001, now issued as U.S. Pat. No. 6,641,315, which is a continuation-in-part of U.S. application Ser. No. 09/112,767 filed on Jul. 10, 1998, now issued as U.S. Pat. No. 6,416,167, the entire contents of which are herein incorporated by reference.

FIELD OF INVENTION

This invention relates to a user interface with integrated printing. More particularly, the invention relates to a computer system that occupies a relatively small workspace or "footprint".

BACKGROUND TO THE INVENTION

Printers for use with computers can be relatively expensive devices. Accordingly, in a work environment, it is common for a plurality of work stations to be serviced by a single printer station with the computers of those work stations communicating with the printer.

This necessitates people at the work station having to get up and collect their documents from the printer which can be time wasting. Often, all that is required is a single sheet of paper, for example, where a letter is to be generated or where an image is to be viewed and a hard copy of the image is required.

Desktop inkjet printers are available at low cost, but typically take up substantial desk space. Incorporation of the printing function in a desktop computer keyboard frees up this desk space.

While it is technically possible to incorporate a scanning ink jet printer into a keyboard, this has several disadvantages, including excess bulk, and side-to-side vibration as the printhead scans.

Recently, the present inventor has invented ink jet printer technologies suitable for incorporation in a desktop keyboard, such as:

| | | | | |
|---|---|---|---|---|
| 6,227,652 | 6,213,588 | 6,213,589 | 6,231,163 | 6,247,795 |
| 09/113,099 | 6,244,691 | 6,257,704 | 09/112,778 | 6,220,694 |
| 6,257,705 | 6,247,794 | 6,234,610 | 6,247,793 | 6,264,306 |
| 6,241,342 | 6,247,792 | 6,264,307 | 6,254,220 | 6,234,611 |
| 09/112,808 | 09/112,809 | 6,239,821 | 09/113,083 | 6,247,796 |
| 09/113,122 | 09/112,793 | 09/112,794 | 09/113,128 | 09/113,127 |
| 6,227,653 | 6,234,609 | 6,238,040 | 6,188,415 | 6,227,654 |
| 6,209,989 | 6,247,791 | 09/112,764 | 6,217,153 | 09/112,767 |
| 6,243,113 | 09/112,807 | 6,247,790 | 6,260,953 | 6,267,469 |
| 09/425,419 | 09/425,418 | 09/425,194 | 09/425,193 | 09/422,892 |
| 09/422,806 | 09/425,420 | 09/422,893 | 09/693,703 | 09/693,706 |
| 09/693,313 | 09/693,279 | 09/693,727 | 09/693,708 | 09/575,141 |

These ink jet technologies are suitable for the construction of miniature, low cost pagewidth printers, which can readily fit within a keyboard form factor.

SUMMARY OF THE INVENTION

According to a first aspect of the present invention there is provided a compact desktop computer system including;
   a keyboard having an integrated pagewidth printer;
   a computer in communication with the keyboard; and
   a data bus interconnecting the keyboard and the computer;
   wherein commands from the keyboard to the computer and signals from the computer to the pagewidth printer are transferred over the data bus.

In a preferred embodiment the data bus comprises a universal serial bus (USB).

Preferably the printer is located within a housing of the keyboard.

The keyboard may include a port to receive an ink cartridge to replenish the integrated pagewidth printer.

According to a further aspect of the present invention there is provided a compact desktop computer system including;
   a keyboard having a housing in which is located a pagewidth printer;
   a port to receive an ink cartridge formed in the housing to replenish the pagewidth printer; and
   a computer in communication with the keyboard by means of a serial data bus; wherein commands from the keyboard to the computer and signals from the computer to the pagewidth printer are transferred over the serial data bus.

BRIEF DESCRIPTION OF THE DRAWINGS

The invention is now described by way of example with reference to the accompanying diagrammatic drawings in which.

DETAILED DESCRIPTION OF THE DRAWINGS

Figure 2:
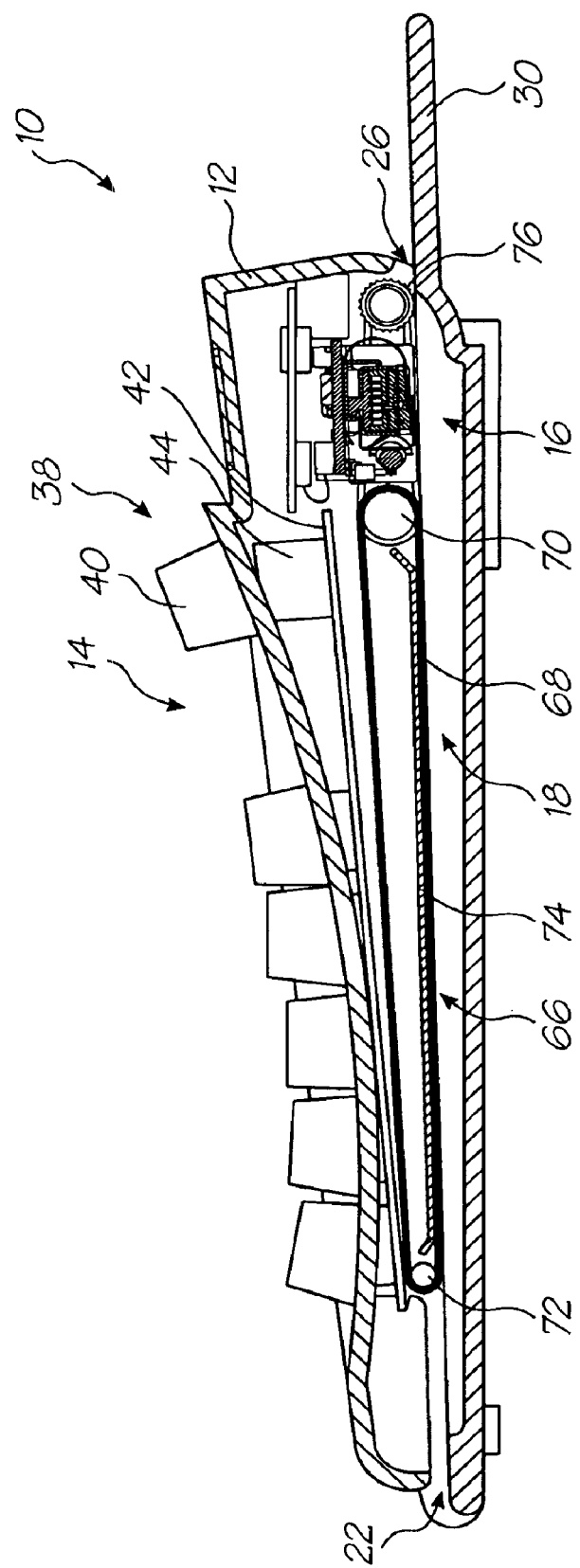
FIG. 2 shows a sectional side view of the keyboard.
Figure 3:
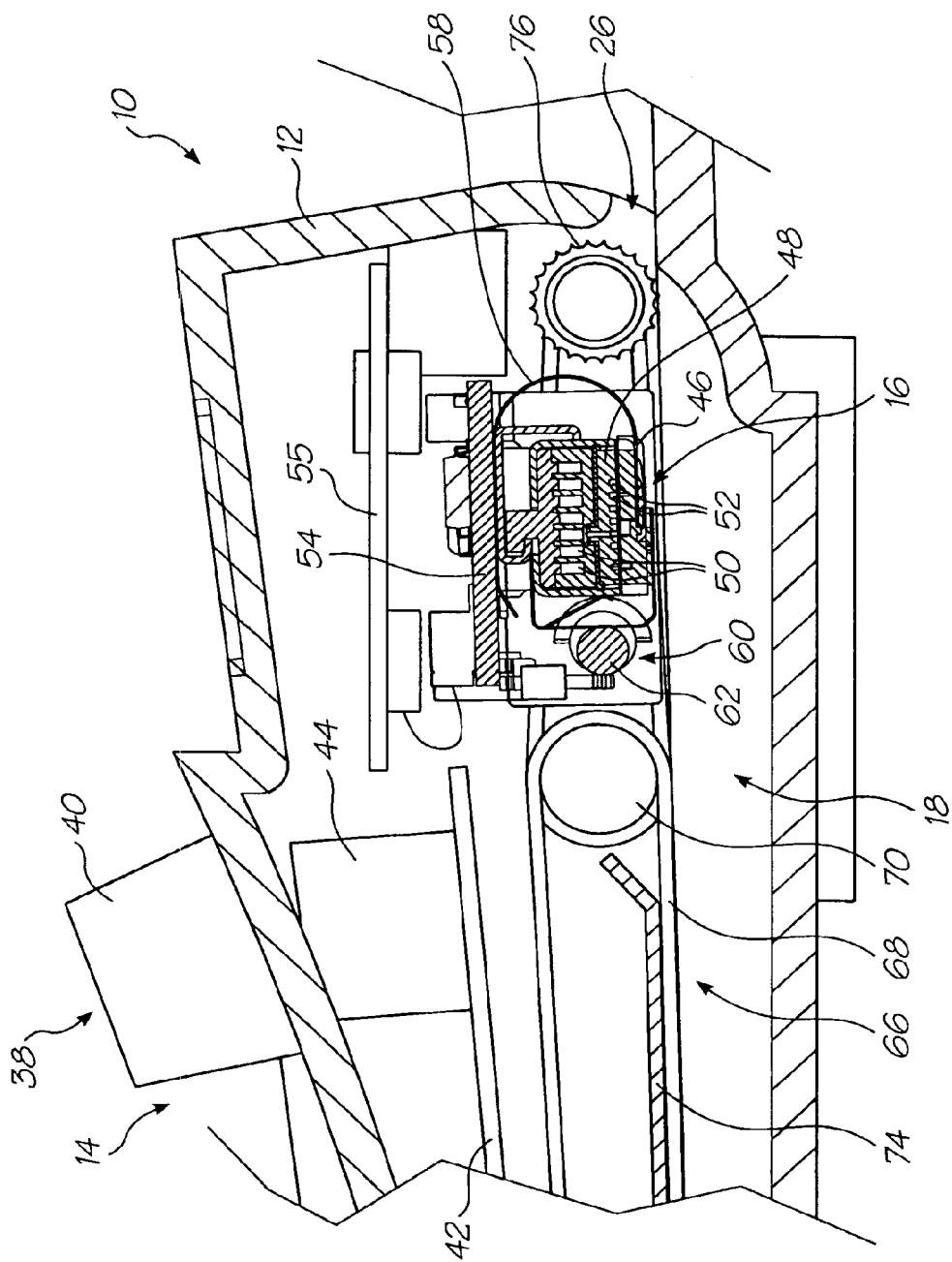
FIG. 3 shows, on an enlarged scale, a sectional side view of part of the keyboard.

In the drawings, reference numeral 10 generally designates a keyboard in accordance with the invention. The keyboard 10 is intended particularly for use with a computer. The keyboard 10 comprises a housing 12 on which a keypad 14 is arranged. A printer 16 (FIGS. 2 and 3) is contained in a chamber 18 defined in the housing 12 of the keyboard 10.

The housing 12 is dimensioned similarly to a conventional computer keyboard and is substantially rectangular when viewed in plan having a pair of opposed, longer sides and a pair of opposed, shorter sides. An input slot 22 is defined in one of the longer sides of the housing 12 for feeding print media in the form of a sheet of paper 24 to the printer 16. Preferably, the input slot 22 is defined in that side of the housing 12 which, in use, is closer to a user of the keyboard 10.

An ejection slot 26 is defined in an opposed, longer side of the housing through which the sheet of print media, incorporating an image 28, is ejected after completion of printing. An exit tray 30 extends outwardly from the ejection slot 26 on to which the sheet of paper 24 is fed after printing.

The keypad 14 includes an array if keys 38 arranged in a QWERTY keypad 32, a numerals keypad 34 and a plurality of control keys 36. Each key 38 of the keypad 14 includes a key cap 40 which communicates with a keyboard circuit board 42 (FIGS. 2 and 3) through an opening in a top surface of the housing 12. The key caps 40 engage key switches 44 mounted on the circuit board 42.

The printer 16 comprises a page width ink jet printhead 46 mounted in a support 48. The printhead 46 is a multi-color printhead for printing photo quality images 28. Accordingly, the support 48 includes a plurality of galleries 50, each of which contains a different color ink to be fed via passages 52 to the printhead 46.

Figure 1:
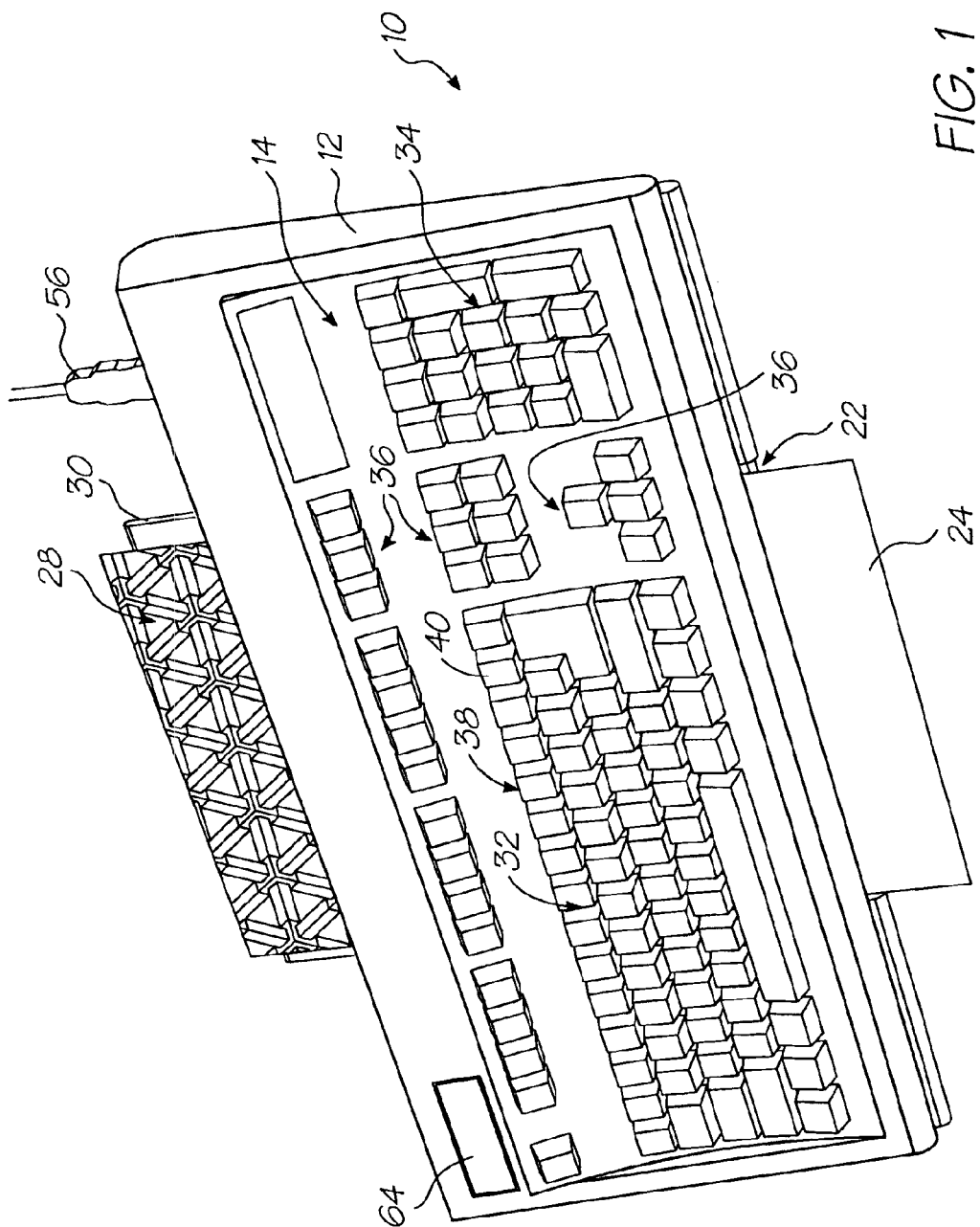
FIG. 1 shows a three dimensional view of a keyboard, in accordance with the invention.

The printer 16 includes a controller printed circuit board (PCB) 55. The PCB 55 receives printing commands from the computer (not shown) via a USB connector 56 (FIG. 1). A printhead PCB 54 communicates with the printhead 46 via a TAB automated bond film 58 or any other suitable, flexible film. The controller PCB 55 connects to the printhead PCB 54 via a flexible film.

A retaining device, in the form of a locking member 60, releasably locks the printer 16 in position in the chamber 18 of the housing 12. The locking device 60 includes a cam-like locking member 62.

Further, the printer 16 includes an ink supply cartridge (not shown) for feeding ink to the galleries 50 of the printhead support 48. The ink supply cartridge is accessed through an opening, closed off by a lid 64 (FIG. 1), in a top surface of the housing 12 to replace the cartridge when its supply of ink has been depleted.

The keyboard 10 includes a feed mechanism 66 for feeding the sheet of paper 24 to the printer 16. The feed mechanism 66 comprises an endless belt 68 which is rotated by a drive roller 70 and extends about an opposed, idler roller 72. A planar member in the form of a sprung metal plate 74 bears against the belt 68 to maintain the planarity of the belt 68 and, accordingly, the sheet of paper 24.

An engaging means, in the form of at least one spiked wheel 76, is arranged intermediate the printer 16 and the ejection slot 26. The, or each, spiked wheel 76 engages the sheet of paper 24, after printing of the image 28, and feeds the sheet of paper 24 through the ejection slot 26 to be accessed by the user.

In use, when an image 28 is to be printed, the user inserts a sheet of paper into the keyboard through the input slot 22 where it is fed to the printer 16 by the feed arrangement 66. By means of an appropriate command via the computer, the information or image to be printed is fed to the printer 16 via the USB connector 56 and the controller PCB 55. The printer 16 is controlled by the PCB 55 to print the image 28 on the sheet of paper 24 and to cause ejection of the sheet of paper 24 together with its printed image 28 thereon through the ejection slot 26.

It is an advantage of the invention that a computer peripheral is provided which enables a person rapidly to obtain copies of images while seated before the person's computer. In this regard, it is to be noted that the printer 16 is a high speed printer which can print at rates of up to 30 pages per minute. Hence, the need for using a communal work station is obviated. In addition, the incorporation of the printer within the keyboard 10 considerably reduces the space required for a computer together with its peripherals and, in so doing, providing more space to a user. It will be appreciated that this can be of major benefit where the work station is a confined working space.

What is claimed is:

1. A compact desktop computer system including;
    a keyboard having a housing including an entrance aperture and an exit aperture;
    a print media transport path extending from said entrance aperture to said exit aperture;
    an integrated pagewidth printer disposed within said housing;
    a computer in communication with the keyboard; and
    a data bus interconnecting the keyboard and the computer;
    wherein commands from the keyboard to the computer and signals from the computer to the pagewidth printer are transferred over the data bus;
    wherein the printhead is disposed in an operative position relative to the print media transport path for printing onto print media as said print media is transported from said entrance aperture to said exit aperture;
    and wherein said print media passes wholly within said housing as said print media is transported along said print media transport path.

2. A compact desktop computer system according to claim 1, wherein the data bus comprises a universal serial bus (USB).

3. A compact desktop computer system according to claim 1, wherein the printer is located within a housing of the keyboard.

4. A desktop computer system according to claim 1, wherein the keyboard includes a port to receive an ink cartridge to replenish the integrated pagewidth printer.

5. A compact desktop computer system including;
    a keyboard having a housing in which is located a pagewidth printer;
    the housing including an entrance aperture and an exit aperture;
    a print media transport path extending from said entrance aperture to said exit aperture;
    a port to receive an ink cartridge formed in the housing to replenish the pagewidth printer; and
    a computer in communication with the keyboard by means of a serial data bus; wherein commands from the keyboard to the computer and signals from the computer to the pagewidth printer are transferred over the serial data bus;
    wherein the printhead is disposed in an operative position relative to the print media transport path for printing onto print media as said print media is transported from said entrance aperture to said exit aperture;
    and wherein said print media passes wholly within said housing as said print media is transported along said print media transport path.

* * * * *